United States Patent [19]

Faiz et al.

[11] Patent Number: 4,681,724
[45] Date of Patent: Jul. 21, 1987

[54] REMOVABLE IRREVERSIBLY SHRINKING MALE MANDREL

[75] Inventors: Robert L. Faiz, Sandy Hook; William J. Walker, Monroe; Philip Ramey, Milford; Kenneth M. Adams, Sandy Hook; Nicholas P. Flonc, Hamden; Dean Nguyen, Stamford, all of Conn.

[73] Assignee: United Technologies Corporation, Hartford, Conn.

[21] Appl. No.: 856,898

[22] Filed: Apr. 28, 1986

[51] Int. Cl.⁴ .............................................. B29C 1/08
[52] U.S. Cl. .................................... 264/257; 264/221; 264/313; 264/317; 249/62; 249/115; 249/178
[58] Field of Search ................... 249/61, 62, 112, 115, 249/134, 178; 264/DIG. 71, 221, 230, 257, 313, 317; 425/DIG. 12, DIG. 14

[56] References Cited

U.S. PATENT DOCUMENTS

| | | | |
|---|---|---|---|
| 3,882,220 | 5/1975 | Ryder | 264/221 |
| 4,067,949 | 1/1978 | Karabedian | 264/DIG. 71 X |
| 4,095,322 | 6/1978 | Scarpati et al. | 29/156.8 P |
| 4,316,701 | 2/1982 | Scarpati et al. | 416/222 |
| 4,464,324 | 8/1984 | Hagher | 264/221 |
| 4,566,923 | 1/1986 | Mueller | 264/DIG. 71 X |

Primary Examiner—Charles Hart
Attorney, Agent, or Firm—A. Dean Olson

[57] ABSTRACT

A shrinkable foam mandrel that can be easily removed and composite resin transfer molding process that uses the foam mandrel. The foam is dimensionally stable at a first temperature that typically corresponds to the cure temperature of the composite resin. The foam is capable of irreversibly shrinking to less than about 0.5 said foam's original size at a second tempertaure that is above said first tempertaure. The foam is encapsulated by a non-stick elastomer skin and covered with fibers. The fiber covered elastomer encapsulated foam is disposed in a female mold cavity and resin is injected into the female mold cavity. The resin and fibers are cured and the resulting composite component is removed from the female mold. The temperature is raised to the second temperature and the elastomer encapsulated foam male mandrel irreversibly shrink to less than about 0.5 its original size. Finally the shrunken male mandrel is removed from said composite component. These mandrels are a solution to the aerospace industry's flyaway mandrel problem as they are lightweight and can easily be removed from the composite component.

18 Claims, 3 Drawing Figures ved by the United States Government.

DESCRIPTION

1. Technical Field

The field of art to which this invention pertains is composite molds and methods of composite molding particularly male mandrels and resin transfer processes.

2. Background Art

Composite components are increasingly used as replacements for metal components in the aerospace industry as they are lightweight, strong, and damage tolerant. Many of these composite parts are made utilizing resin transfer molding processes. In resin transfer molding, the composite premix is deposited in the volume between a matched female and male mold (male mandrel) so that the composite premix surrounds the male mandrel. Upon curing the male mandrel is typically locked inside the composite component. These "flyaway mandrels" are not desirable in the weight conscious aerospace industry. As a result, there have been numerous attempts to engineer mandrels that can be removed from the component part.

Wax, paraplast and sand mandrels have all been used in attempts to eliminate the flyaway mandrel. However, each of these mandrels is extremely heavy resulting in a composite that is difficult to move during processing. In addition, wax mandrels may require the composite to be exposed to elevated temperatures for long periods of time while the wax is removed. Paraplast mandrels can be heavy, brittle and corrosive. Paraplast mandrels also require elevated temperatures over long time periods for their removal and in addition paraplast residue may be left in the part. Finally, larger paraplast mandrels lack dimensional stability. Sand mandrels are extremely heavy, messy and are expensive to fabricate. Also, sand mandrels can lack dimensional stability.

Accordingly, there has been a constant search in this field of art for molds and methods of molding composites that eliminate the "flyaway mandrel".

DISCLOSURE OF INVENTION

This disclosure is directed to an easily removed elastomeric encapsulated foam mandrel that irreversibly shrinks at a temperature higher than the composite cured temperature. The removable male mandrel is useful in resin transfer molding processes and it comprises a foam that is dimensionally stable at a first temperature. The foam is also capable of irreversibly shrinking to less than about 0.5 said foam's original size at a second temperature that is above said first temperature. The foam is encapsulated by a non-stick elastomer skin.

Another aspect of this disclosure is a resin transfer composite matched mold comprising a female mold and a male mandrel which is a removable elastomer encapsulated foam that irreversibly shrinks. The male mandrel comprises a foam that is dimensionally stable at a first temperature of about 107° C. to about 149° C. The foam is capable of irreversibly shrinking to less than about 0.5 said foam's original size at a second temperature of about 149° C. to about 177° C. The foam is encapsulated by a non-stick elastomer skin.

Yet a third aspect of this disclosure is a resin transfer molding process in which the male mandrel can be irreversibly shrunk at a higher temperature than the composite cure temperature and thus easily removed from the composite component. A male mandrel is formed from a foam that is both dimensionally stable at the composite resin's cure temperature and capable of irreversibly shrinking to less than about 0.5 said foam's original size at a second temperature that is above said first temperature. The foam mandrel is encapsulated with a non-stick elastomer and then covered with fibers. The fiber covered elastomer encapsulated foam is disposed in a female mold cavity and resin is injected into the female mold cavity. The resin and fibers are cured and the resulting composite component is removed from the female mold. The temperature is raised to the second temperature and the elastomer encapsulated foam male mandrel irreversibly shrinks to less than about 0.5 its original size. Finally the shrunken male mandrel is removed from said composite component.

This invention makes a significant advance in the resin transfer molding art as it provides lightweight male mandrels that can be easily removed from the composite component. Thus, these male mandrels solve the aerospace industry's flyaway mandrel problem.

The foregoing and other objects, features and advantages will be apparent from the specification, claims and from the accompanying drawings which will illustrate an embodiment of the invention.

BEST MODE FOR CARRYING OUT THE INVENTION

Figure 1:
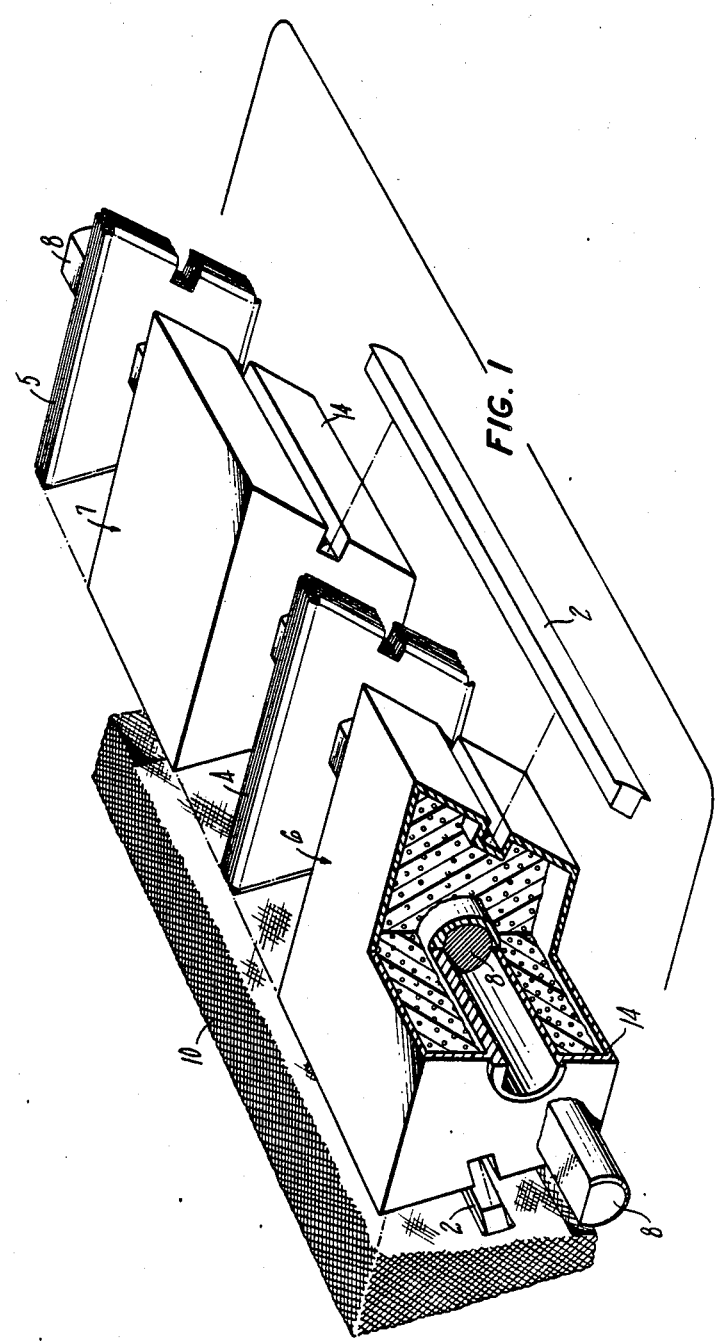
FIG. 1 is an exploded perspective view partly broken away and partly in section of a typical thin wall hollow composite structure with integral stiffeners and bulk heads during fabrication.

The foam used in this invention is dimensionally stable at a first temperature which corresponds to the cure temperature of the particular composite resin used in manufacturing the composite. It is preferable that this temperature is about 225° F. (107° C.) to about 300° F. (149° C.) as this is the cure temperature of typical epoxies used in aerospace composites. Thus, foam that is dimensionally stable at these temperatures will retain its shape and preferably remain within about 0.075 cm of its original dimensions during the composite fabrication process. The foam is also capable of irreversibly shrinking to less than about 0.5 its original size at a second temperature which is above the first temperature (e.g. 107° C. to 149° C.) described above. When the shrinkage is above about 0.5 times its original size, the mandrel may still be too large for easy removal from the composite part. This irreversible shrink property facilitates the removal of the male mandrel from the composite component through an orifice located in the composite part. Irreversible shrinkage distinguishes the mandrel from, for example, wax-type mandrels where once the heat is removed the mandrel solidifies back to a large shape which is not easily removed. It is preferable that this second shrink temperature is about 300° F. (149° C.) to about 350° F. (177° C.) as below about 300° F. (149° C.), the mandrel may shrink during the typical curing of, for example, the epoxy composite. Above about 350° F. (177° C.) the composite part may be adversely affected by the elevated temperatures. The foam that is useful in the practice of this invention has a density of about 3 lb/ft$^3$ (48 kg/m$^3$) to about 10 lb/ft$^3$ (160 kg/m$^3$) as below about 3 lb/ft$^3$ (48 kg/m$^3$) dimensional stability is not maintained during the cure cycle and above about 10 lb/ft$^3$ (160 kg/m$^3$), the shrinkage is less than the desired amount. It is preferred that the density is about 6 lb/ft$^3$ (96 kg/m$^3$) to about 10 lb/ft$^3$ (160 kg/m$^3$) because at this range it has been found there is the desired levels of both dimensional stability and shrinkage as a trade-ff between these two properties exists. In addition, it is preferred that the foam has other characteristics such as low cost, light weight and ease of molding. It is preferable that a maleic anhydride-styrene copolymer foam is used as it exhibits the desired properties described above. It is especially preferred that a copolymer such as Dytherm TM maleic anhydride-styrene copolymer foam available from Atlantic Richfield Company, Los Angeles, California is used.

This foam male mandrel can take virtually any shape. Thus, it is ideal for composite parts that require male mandrels having geometry that would prevent removal of conventional mandrels. It is preferred that the foam male mandrel is down-sized by about 0.125 inch (3.18 millimeters (mm)) to about 0.25 inch (6.35 mm) from the actual shape required of the male mandrel. This facilitates the subsequent attainment of a close tolerance male mandrel because it can be difficult to form the foam to the exact tolerance required. However, if the male mandrel is down-sized it can be easily encapsulated with an elastomer to attain the exact tolerances needed of the male mandrel.

The elastomer skin which encapsulates the male foam mandrel comprises a non-stick elastomer that is resistant to the composite resin. The elastomer's non-stick property allows it to be easily released from the inside of the composite component and does not leave a residue that must be removed. The elastomer's resistance to the composite resin assures that the resin will not penetrate into the foam, thus affecting its shrinkage capability. It has been found that any open cell foam, when penetrated by the composite resin (e.g. epoxy, polyester), does not shrink the desired amount. It is important for the elastomer skin to be an elastomer as its elastic form allows easy removal through a small opening in the part. The elastomer skin should be stable at the first temperature described above (e.g. 107° C.–149° C.) otherwise it will degrade during the cure cycle. It is preferred that the elastomer cures at about room temperature (e.g., 15° C.) to about 220° F. (104° C.) because of storage and dimensional stability requirements. If the elastomer cures at less than room temperature, it may begin curing during storage. If the elastomer cures at a temperature above 220° F. (104° C.), the dimensional stability of the mandrel is reduced due to the thermal expansion of the foam and elastomer during the elevated temperature curing of the elastomer. It is especially preferred that the elastomer is a silicone elastomer because it has the desired properties described above. It is especially preferred that a room temperature two-part curing silicone, such as Sylgard 170 A&B silicone available from (Dow Chemical, Midland, Michigan) is used because of ease of manufacture, low cost and low viscosity. Another coating is Merrco TM elastomer (General Electric, Pittsfield, Mass.). The low viscosity facilitates injection molding. It is preferred that the skin is about 0.125 inch (3.16 mm) to about 0.25 inch (6.35 mm) as below about 0.125 (3.16 mm) resin penetration due to pin holes in the thin elastomer skin could occur and above 0.25 inch (6.35 mm) cure is inhibited as the thick membrane acts as an insulator. The thickness of the skin will vary at different points on its surface because in addition to protecting the foam from the composite resin, the elastomer skin is also utilized to compensate for any inaccuracies in the foam size resulting in a mandrel having the correct size, shape and tolerance. Another desirable elastomer property is low viscosity which facilitates injection molding or casting. Finally, it is preferred that the elastomer skin has a slight elastic compressibility to add forgiveness in closing the mold in order to compensate for layup tolerance (factors).

The female molds of this invention are conventional female molds employed in typical resin transfer processes. However, they should be shaped to impart an orifice to the finished composite part through which the collapsed male mandrel can be withdrawn. The composite fibers used in this invention are conventional fibers used in resin transfer molding processes and particularly adapted for use in the aerospace industry. These fibers are used both as a lay-up or winding that covers the male mandrel. Examples of these fibers are graphite, fiberglass, carbon, polyester, metal mesh (screen) and aramid fibers. These fibers may optionally be impregnated with the following resins. The composite resins used in the practice of this invention are conventional composite resins used in resin transfer molding processes particularly adapted for making aerospace components. Examples include polyimides, acrylics, polyesters, epoxies, vinylesters and bismaliimides. It is especially preferred to use epoxies as these resins best provide the required strength for the aerospace industry. Typically, the composite layup comprises about 30 weight percent by volume (%) to about 60% resin and about 40% to about 70% fibers as the desired strength is obtained in this range.

Alternatively a conventional composite premix comprising conventional resins and conventional chopped fibers can be injected and used in place of the above described fiber layup where structural strength is important.

Figure 2:
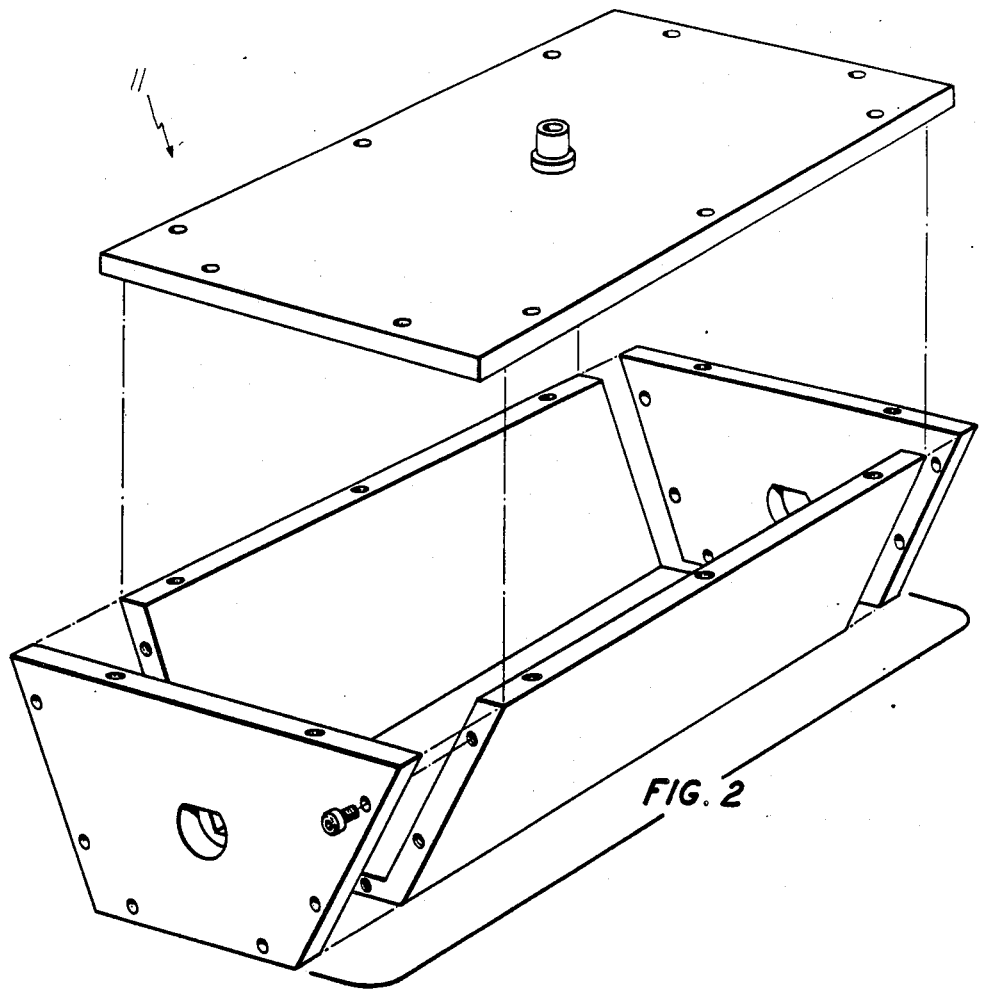
FIG. 2 is an exploded perspective view of a resin transfer mold used to fabricate the above structure. The resin transfer mold defines the outside surface shown in FIG. 3.
Figure 3:
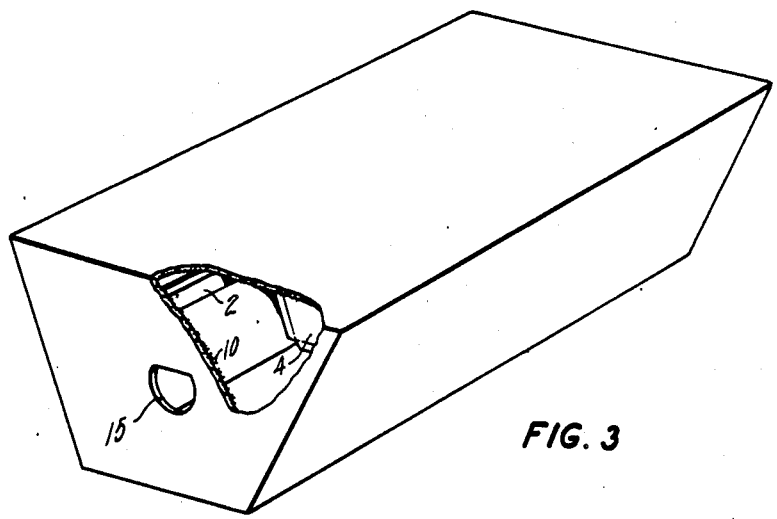
FIG. 3 is a perspective view partly broken away and partly in section of a completed composite component made in accordance with the method of this invention.

A clearer understanding of the invention may be had by reference to the figures. FIG. 1 is an exploded perspective view of a conventional thin wall composite part with integral stiffeners and bulkheads. Stringers 2, bulkhead laminates 4 and 5 and mandrels 6 and 7 are stacked about an optional support shaft 8. FIG. 1 is a broken away (at mandrel 6) to better illustrate the collapsible mandrels. The male mandrel 6 is surrounded by an elastomer skin 14. The support shaft 8 runs through the mandrel 6 and is surrounded by the elastomer skin 14. A composite overlap 10 that surrounds the encapsulated male mandrel completes the layup. FIG. 2 is an exploded perspective view of a resin transfer mold 11 into which the above-described layup is placed. The resin is injected, cured, the support shaft 8 removed and upon subsequent temperature elevation, the mandrels 6 and 7 collapse. Once collapsed, the male mandrel 6 and 7 and elastomer skin 14 can be removed through the orifice 15, (only one shown) in the complete composite shown in FIG. 3.

The removable male mandrels of this invention are useful in resin transfer molding processes because in these processes, the composites are typically cured with the application of elevated temperatures in the absence of elevated pressures. In other processes, such as a typical fiber layup using pre-impregnated composite materials, elevated pressures in addition to elevated temperatures are required. These elevated pressures (e.g., 40–50 psi, 0.27–0.41 MPa) are not compatible with the male mandrel of this invention because the typically high pressures required will collapse the mandrel during cure.

In the process of this invention, the desired foam is formed into the appropriate shape (described above) using a variety of conventional processes such as machining, coating and injection molding. The foam is then encapsulated with the above-described elastomers utilizing any number of known processes such as casting, injection molding and spraying. However, it is preferred to injection mold the elastomer onto the foam mandrel because this process will produce a defect-free (e.g. no pinholes) mandrel having close tolerances. This skin compensates for the foam which typically cannot be formed into a close tolerance shape. The elastomer skin is cured at the above described third temperature (e.g., room temperature to 222° F. (104° C.)). The elastomer encapsulated foam mandrel can then be covered with fibers by conventional processes such as winding or laying up. The fiber coated elastomer encapsulated foam mandrel is then positioned into the female mold cavity (between the male mandrel and female mold). It is held in place by conventional index (positioning) tooling. The resin can then be injected into the mold cavity using a variety of injection techniques such as pressure, vacuum and a combination of both. The injection is typically accomplished at a temperature of about room temperature to about 150° F. (66° C.) and pressures of about 5 psi to about 25 psi (0.034–0.17 MPa). The composite resin and fibers are then cured into a composite at the above-described first temperature (e.g., 107° C.–149° C.) which is below the temperature at which the foam shrinks. For the especially preferred epoxies, these cure temperatures are about 225° F. (107° C.) to about 300° F. (149° C.). The curing cycles are typically about 1 hour to about 12 hours and are known to those skilled in the art. Alternatively the encapsulated male mandrel can be positioned in the female mold cavity (e.g. there is no fiber layup) and a conventional resin and chopped fiber mix is injected into the cavity and cured at conventional temperatures and pressures over times known to those skilled in the art. The composite component (and elastomer coated foam mandrel) is then raised to the above-described second (shrink) temperature (e.g. 149° C.–177° C.) (which is above the cure temperature of the composite component). The composite component and male mandrel are maintained at this shrink temperature long enough for the elastomer covered foam to shrink to a size less than about 0.5 its original size. This typically takes about 1 hour to about 4 hours. This shrinkage is irreversible and thus it contrasts with a mandrel made from wax in that the wax mandrel must be maintained at elevated temperatures in order to facilitate its removal. Subsequent to shrinkage, the composite part including mandrels are removed from the female mold and the male mandrel can then be withdrawn through the orifice provided in the composite component.

EXAMPLE

Dytherm TM maleic anhydride-styrene beads were pre-expanded for a density of about 7.5 lbs/ft$^3$. The beads were injected into a mold (undersized by about 0.375 inch) followed by steam which fused the beads. The foam mandrel was ejected from the mold and oven dried. The foam production was carried out by a plastics fabricator such as Tuscarora Plastics (New Jersey) or Preferred Plastics (Connecticut).

The foam mandrels were placed into molds that had been cleaned and treated with a release agent. Sylgard TM parts A and B elastomer were mixed and injected into the mold at 20 psi at room temperature and cured at room temperature for 24 hours. The encapsulated male mandrel was removed from the mold.

The female composite mold was cleaned and treated with Monokote TM release agent available from Chemtrend. Woven fiberglass and graphite fabric plies were laid up to form internal stiffeners and bulkheads, the elastomer encapsulated mandrels were positioned and "inner skin" plies were applied to the mandrel. The mandrels and plies were compressed with clamping pressure on a mandrel alignment shaft and outer overlap plies were applied. The mandrel assembly was installed in a female mold cavity which was closed and sealed. Shell 94009 TM resin was resin transfer injected at 25 psi and 65° C. The system was cured at 121° C. for 2 hours and then the temperature was raised to 143° C. for an additional 2 hours. At that time the temperature was raised to 177° C. for 4 hours and then allowed to cool. The mold was opened and the alignment shaft composite part and consumable mandrels were removed.

These male mandrels, molds and resin transfer molding processes can be used in the fabrication of a variety of composite components, for example, reinforced cylinders, thin wall structures, integrally reinforced structures, air foil structures and reinforced structural beams. Specifically, such components as tail cones, fuselage panels may be advantageously fabricated using this invention. This invention can be advantageously applied to fabricate virtually any composite component that can be resin transfer molded. The sole constraint on the composite shape is that an orifice must be provided in the composite in order that the shrunken male mandrel can be removed. Although this invention has been directed to making composite components for aerospace applications, those skilled in the art can readily realize its application to composites in other areas such as the automotive field, marine field and for consumer products.

These male mandrels make a significant advance in the field of composite molding. These lightweight mandrels facilitate composite component fabrication and eliminate the need for maintaining the composite component at elevated temperatures in order to keep wax in a molten state. In addition, the mandrels although not reusable can be made from low cost foams and elastomers which result in a considerable cost advantage over other mandrels and processes. They provide efficient molding of unitized components while reducing or eliminating secondary bonding and assembly operations. Elimination of these secondary operations is required in the manufacture of composite components exhibiting lightweight strength at high rates of manufacture.

It should be understood that the invention is not limited to the particular embodiment shown and described herein, but that various changes and modifications may be made without departing from the spirit or scope of this concept as defined by the following claims.

We claim:

1. A removable male mandrel for composite resin transfer molding processes, said male mandrel comprising:
   a. a foam that is dimensionally stable at a first temperature;
   b. said foam capable of irreversibly shrinking to less than about 0.5 said foam's original size at a second temperature that is above said first temperature; and
   c. said foam encapsulated by a non-stick elastomer skin.

2. The removable male mandrel as recited in claim 1 wherein the foam comprises a maleic anhydride-styrene copolymer.

3. The removable male mandrel as recited in claim 1 wherein the elastomer skin comprises a silicone polymer.

4. The removable male mandrel as recited in claim 1 wherein the elastomer skin is about 3.05 millimeters to about 6.35 millimeters thick.

5. The removable male mandrel as recited in claim 1 wherein the first temperature is about 107° C. to about 149° C.

6. The removable male mandrel as recited in claim 1 wherein the second temperature is about 149° C. to about 177° C.

7. A resin transfer composite matched mold comprising a male mandrel and a female mold having a cavity wherein the improvement comprises said male mandrel comprising:
   a. a foam that is dimensionally stable at a first temperature of about 107° C. to about 149° C.;
   b. said foam capable of irreversibly shrinking to less than about 0.5 said foam's original size at a second temperature of about 149° C. to about 177° C.; and
   c. said foam encapsulated by a non-stick elastomer skin.

8. A composite resin transfer molding process comprising placing a fiber covered male mandrel in a female mold cavity injecting said female mold cavity with a resin and curing the resin at its cure temperature comprising:
   a. forming a male mandrel from a foam
      (i) that is dimensionally stable at a first temperature which corresponds to said resin's cure temperature;
      (ii) said foam capable of irreversibly shrinking to less than about 0.5 said foam's original size at a second temperature that is above said first temperature;
   b. encapsulating said foam male mandrel with a non-stick elastomer at a third temperature;
   c. covering said elastomer encapsulated foam with fibers;
   d. placing said fiber covered elastomer encapsulated foam in a female mold cavity;
   e. injecting said female mold cavity with a resin;
   f. curing said resin and said fibers at said first temperature to form a composite component;
   g. removing said female mold cavity from said composite component;
   h. irreversibly shrinking said elastomer encapsulated foam male mandrel to less than about 0.5 said elastomer encapsulated foam's original size by raising the temperature to said second temperature; and
   i. withdrawing said irreversibly shrunken elastomer encapsulated foam male mandrel from said composite component.

9. The resin transfer molding process as recited in claim 8 wherein said foam male mandrel is formed by molding.

10. The resin transfer molding process as recited in claim 8 wherein said first temperature is about 107° C. to about 149° C.

11. The resin transfer molding process as recited in claim 8 wherein said second temperature is about 149° C. to about 177° C.

12. The resin transfer molding process as recited in claim 8 wherein said third temperature is about room temperature to about 122° C.

13. The resin transfer molding process as recited in claim 8 wherein said foam is encapsulated with said non-stick elastomer by casting.

14. The resin transfer molding process as recited in claim 8 wherein said elastomer encapsulated foam is wrapped with fibers.

15. The resin transfer molding process as recited in claim 8 wherein said foam mandrel comprises a maleic anhydride-styrene copolymer.

16. The resin transfer molding process as recited in claim 8 wherein said non-stick elastomer comprises a silicone polymer.

17. The resin transfer molding process as recited in claim 8 wherein said fibers are resin impregnated fibers.

18. The resin transfer molding process as recited in claim 8 wherein said resin comprises an epoxy resin.

* * * * *